US012735575B2

(12) United States Patent
Sill et al.

(10) Patent No.: US 12,735,575 B2
(45) Date of Patent: Sep. 15, 2026

(54) DYE-CONTAINING WATER-SOLUBLE RECEPTACLE AND METHOD FOR PRODUCING A COLOURED AQUEOUS ALKALI METAL CYANIDE SOLUTION

(71) Applicant: CYPLUS GMBH, Darmstadt (DE)

(72) Inventors: Torsten Sill, Bruehl (DE); Bernd Schmidt, Steinau (DE); Lena Megatif, Cologne (DE); Bernd Schumacher, Bornheim (DE); Murillo Villela Filho, Sailauf (DE)

(73) Assignee: CYPLUS GMBH, Darmstadt (DE)

( * ) Notice: Subject to any disclaimer, the term of this patent is extended or adjusted under 35 U.S.C. 154(b) by 721 days.

(21) Appl. No.: 18/041,892

(22) PCT Filed: Aug. 17, 2021

(86) PCT No.: PCT/EP2021/072800

§ 371 (c)(1),
(2) Date: Feb. 16, 2023

(87) PCT Pub. No.: WO2022/038118

PCT Pub. Date: Feb. 24, 2022

(65) Prior Publication Data

US 2023/0357576 A1 Nov. 9, 2023

(30) Foreign Application Priority Data

Aug. 17, 2020 (EP) .................................... 20191314

(51) Int. Cl.
*C09B 67/02* (2006.01)
*B65D 65/46* (2006.01)
*C08F 216/06* (2006.01)

(52) U.S. Cl.
CPC .......... *C09B 67/0097* (2013.01); *B65D 65/46* (2013.01); *C08F 216/06* (2013.01)

(58) Field of Classification Search
CPC .. C08F 216/06; C08F 218/08; C08F 2020/20; C09B 67/0097; B65D 65/46
(Continued)

(56) References Cited

U.S. PATENT DOCUMENTS 5,145,484 A 9/1992 Lacroix et al.
6,124,036 A 9/2000 Brown et al.
(Continued)

FOREIGN PATENT DOCUMENTS

CH 579667 B5 9/1976
EP 0457715 A2 11/1991
(Continued)

OTHER PUBLICATIONS

Zezin et al., "High-molecular compounds" Textbook and Practice for Academic Bachelor's Degree, Yurait, pp. 324-327 (2016).
(Continued)

*Primary Examiner* — Tri V Nguyen
(74) *Attorney, Agent, or Firm* — RAPHAEL BELLUM PLLC

(57) ABSTRACT

The invention relates to a water-soluble receptacle which is suitable for accommodating an additive or an additive composition and is filled with an additive or an additive composition comprising at least one dye or at least one dye composition, wherein the water-soluble receptacle has a wall thickness in the range from 5 to 50 μm, and wherein the water-soluble receptacle comprises a water-soluble polymer composition or consists of a water-soluble polymer composition, wherein the polymer composition comprises:

a) at least one polyvinyl alcohol copolymer P1 having a degree of hydrolysis in the range from 75 to 95 mol %, wherein the polyvinyl alcohol copolymer P1 is a copolymer which comprises
vinyl alcohol repeating units,
vinyl ester repeating units and
repeating units of at least one comonomer,
wherein the at least one comonomer is selected from pentaerythritol acrylate and pentaerythritol acrylate derivatives and also optionally acrylic acid;

and/or b) at least one polyvinyl alcohol P2 having a degree of hydrolysis in the range from 87 to 95 mol %;

wherein, in addition to the at least one polyvinyl alcohol copolymer P1 and/or the at least one polyvinyl alcohol P2, the polymer composition can additionally optionally contain additive substances;

wherein the polymer composition, in the case in which it comprises at least one polyvinyl alcohol copolymer P1 and no polyvinyl alcohol P2, has a content of repeating units of the at least one comonomer in a range from in total 10% to 20% by weight, based on the total weight of polyvinyl alcohol copolymer P1; and wherein the polymer composition, in the case in which it comprises at least one polyvinyl alcohol copolymer P1 and at least one polyvinyl alcohol P2, has a content of repeating units of the at least one comonomer in a range from in total 10% to 20% by weight, based on the total weight of polyvinyl alcohol copolymer P1 and polyvinyl alcohol P2. The water-soluble receptacle can advantageously be used in a method for producing a coloured aqueous alkali metal cyanide solution. To this end, the water-soluble receptacle can be provided together with an alkali metal cyanide compound in the form of a composition Z1. The invention also relates to a method for producing said composition Z1 and to the use of said composition for producing a coloured aqueous alkali metal cyanide solution (composition Z2).

19 Claims, No Drawings

(58) Field of Classification Search
USPC ........................................ 252/182.34, 218.34
See application file for complete search history.

(56) References Cited

U.S. PATENT DOCUMENTS

| | | | |
|---|---|---|---|
| 8,287,616 B2 | 10/2012 | Seelmann-Eggebert et al. | |
| 9,951,161 B2 * | 4/2018 | Kumaki | C08F 8/12 |
| 10,183,794 B2 * | 1/2019 | Souter | B65D 81/3261 |
| 2016/0083490 A1 | 3/2016 | Kumaki et al. | |
| 2017/0298216 A1 * | 10/2017 | Labeque | C08J 5/18 |

FOREIGN PATENT DOCUMENTS

| | | |
|---|---|---|
| RU | 2375477 C2 | 12/2009 |
| RU | 2528453 C2 | 3/2014 |
| RU | 2546651 C2 | 3/2014 |
| TW | 201619273 A | 6/2016 |
| WO | 0216205 A1 | 2/2002 |
| WO | 2011094472 A1 | 8/2011 |
| WO | 2011094690 A1 | 8/2011 |
| WO | 2016061069 A2 | 4/2016 |

OTHER PUBLICATIONS

International Cyanide Management Institute "ICMI Seeks Comments on Proposed Requirement for the Use of Colorant Dyes in High Strength Cyanide Solutions at Mining Operations" Aug. 9, 2017.

International Search Report in International Application No. PCT/EP2021/072800, dated Sep. 24, 2021.

Stewart Needham "Golden Cross Mine, New Zealand Closure and Rehabilitation" May 2003.

* cited by examiner

DYE-CONTAINING WATER-SOLUBLE RECEPTACLE AND METHOD FOR PRODUCING A COLOURED AQUEOUS ALKALI METAL CYANIDE SOLUTION

The invention relates to a water-soluble receptacle which is filled with at least one dye or at least one dye composition. The water-soluble receptacle of the invention can be used in a method for producing coloured aqueous alkali metal cyanide solutions. The invention also relates to a method for producing a pre-application composition, comprising at least one water-soluble receptacle of the invention and at least one water-soluble alkali metal cyanide compound, and to the aqueous application composition obtainable therefrom by dissolution.

PRIOR ART

Alkali metal cyanide compounds, especially sodium cyanide, are used in the mining industry as leaching agents, in particular in the extraction of gold and silver. Usually, solid alkali metal cyanide is supplied to the mine and is dissolved in water or an aqueous solvent on site in the mine at a dissolution station in order to produce an aqueous alkali metal cyanide solution as leaching agent. The aqueous alkali metal cyanide solution is brought into contact with the ore, with the accessible metal of the ore being dissolved by formation of a corresponding metal cyanide complex. Depending on the geographical location of the mine, the water used for the dissolution can have low temperatures, often ≤15° C., a high degree of hardness or a high salinity.

The alkali metal cyanide compounds used are problematic for humans and the environment. The alkali metal cyanide solution is colourless and cannot be distinguished from water by the naked eye. It is therefore not possible in particular in the event of leakages to identify with the naked eye whether it is just water that is involved or an alkali metal cyanide solution. In order to make alkali metal cyanide solutions distinguishable from water, these may be dyed. For relatively strong alkali metal cyanide solutions, this is required by the International Cyanide Management Institute.

If the desire is to produce weak and stronger alkali metal cyanide solutions from the same delivered batch of solid alkali metal cyanide and to be able to distinguish the weak alkali metal cyanide solutions from the stronger alkali metal cyanide solutions, the dyeing is performed at the dissolution station when the need for dyeing actually arises.

Alternatively, two batches of solid alkali metal cyanide could be kept available, one uncoloured for the weak alkali metal cyanide solutions and one dyed for the stronger alkali metal cyanide solutions. However, this would be associated with a correspondingly greater storage requirement and additional capital commitment.

Water-soluble receptacles based on polyvinyl alcohols and suitable for accommodating additives are known from the prior art and are described, for example, in U.S. Pat. No. 6,124,036, WO 02/16205, EP 0 457 715 and CH 579 667. However, the water-soluble receptacles disclosed are unsuitable for use in aqueous solvents which are often present in mines (aqueous solvents having low temperature, high hardness or salinity) and cannot enable the dissolution of the receptacles under these conditions in sufficiently good time or can do so only incompletely.

The object of the present invention is to provide a way in which a dye situated in a water-soluble receptacle or a dye composition situated in a water-soluble receptacle can be added to the water or to the aqueous solvent at the dissolution station in the simplest possible manner and in good time. In particular, the intention is for virtually complete dissolution to be guaranteed in good time even under the conditions prevailing in some mines (low ambient temperature and water temperature, water with a high content of salts and minerals (in particular NaOH, NaCl, $CaCO_3$, $Ca(OH)_2$ and $MgCO_3$)).

DESCRIPTION

The object is achieved according to the invention by a water-soluble receptacle which is suitable for accommodating an additive or an additive composition and is filled with an additive or an additive composition comprising at least one dye or at least one dye composition, wherein the water-soluble receptacle has a wall thickness in the range from 5 to 50 μm, and wherein the water-soluble receptacle comprises a water-soluble polymer composition or consists of a water-soluble polymer composition, wherein the polymer composition comprises:

a) at least one polyvinyl alcohol copolymer P1 having a degree of hydrolysis in the range from 75 to 95 mol %, wherein the polyvinyl alcohol copolymer P1 is a copolymer which comprises
 vinyl alcohol repeating units,
 vinyl ester repeating units and
 repeating units of at least one comonomer,
 wherein the at least one comonomer is selected from pentaerythritol acrylate and pentaerythritol acrylate derivatives and also optionally acrylic acid;

and/or b) at least one polyvinyl alcohol P2 having a degree of hydrolysis in the range from 87 to 95 mol %;

wherein, in addition to the at least one polyvinyl alcohol copolymer P1 and/or the at least one polyvinyl alcohol P2, the polymer composition can additionally optionally contain additive substances;

wherein the polymer composition, in the case in which it comprises at least one polyvinyl alcohol copolymer P1 and no polyvinyl alcohol P2, has a content of repeating units of the at least one comonomer in a range from in total 10% to 20% by weight, based on the total weight of polyvinyl alcohol copolymer P1; and wherein the polymer composition, in the case in which it comprises at least one polyvinyl alcohol copolymer P1 and at least one polyvinyl alcohol P2, has a content of repeating units of the at least one comonomer in a range from in total 10% to 20% by weight, based on the total weight of polyvinyl alcohol copolymer P1 and polyvinyl alcohol P2.

Pentaerythritol acrylate derivatives in the context of this invention are pentaerythritol acrylates in which at least some of the hydrogen atoms present therein have been substituted by alkyl radicals, in particular by alkyl radicals having 1 to 3 carbon atoms.

In one embodiment, the invention relates to a water-soluble receptacle which is suitable for accommodating an additive or an additive composition and is filled with an additive or an additive composition comprising at least one dye or at least one dye composition, wherein the water-soluble receptacle has a wall thickness in the range from 5 to 50 μm, and wherein the water-soluble receptacle consists of a polymer composition, wherein the polymer composition comprises at least one polyvinyl alcohol copolymer P1, wherein the comonomer content is in a range from in total 10% to 20% by weight, based on the total weight of polyvinyl alcohol copolymer P1. In this embodiment, the polymer composition does not comprise any polyvinyl alcohol P2 according to this invention.

In a further embodiment, the invention relates to a water-soluble receptacle which is suitable for accommodating an additive or an additive composition and is filled with an additive or an additive composition comprising at least one dye or at least one dye composition, wherein the water-soluble receptacle has a wall thickness in the range from 5 to 50 μm, and wherein the water-soluble receptacle consists of a polymer composition, wherein the polymer composition comprises at least one polyvinyl alcohol P2. The polyvinyl alcohol copolymer P2 is a copolymer of vinyl alcohol repeating units and vinyl ester repeating units. In this embodiment, the polymer composition does not comprise any polyvinyl alcohol copolymer P1 according to this invention.

In a further embodiment, the invention relates to a water-soluble receptacle which is suitable for accommodating an additive or an additive composition and is filled with an additive or an additive composition comprising at least one dye or at least one dye composition, wherein the water-soluble receptacle has a wall thickness in the range from 5 to 50 μm, and wherein the water-soluble receptacle comprises a water-soluble polymer composition or consists of a water-soluble polymer composition, wherein the polymer composition comprises at least one polyvinyl alcohol copolymer P1 and at least one polyvinyl alcohol P2, wherein the comonomer content is in a range from in total 10% to 20% by weight, based on the total weight of polyvinyl alcohol copolymer P1 and polyvinyl alcohol P2. In this embodiment, the polymer composition comprises a mixture of at least one polyvinyl alcohol copolymer P1 and at least one polyvinyl alcohol P2 according to this invention.

The receptacle with the additive or the additive composition can be placed into the water or the aqueous solvent in the dissolution station. It dissolves and consequently releases the additive or the additive composition comprising the dye or the dye composition.

It is thus possible, from the same batch of solid alkali metal cyanide, to produce both uncoloured alkali metal cyanide solutions (i.e. the receptacle comprising the additive or the additive composition is not placed into the water or the aqueous solvent) and coloured alkali metal cyanide solutions (i.e. the receptacle comprising the additive or the additive composition is placed into the water or the aqueous solvent).

Alternatively, it is also possible to supply solid alkali metal cyanide with an added receptacle of the invention comprising the additive or the additive composition, for example in a common package. With such a supplied combination of solid alkali metal cyanide on the one hand and receptacle comprising the additive or the additive composition on the other, there is no need in the mine to modify the established processes at or in the dissolution station. The combination mentioned can simply be brought together with the water or the aqueous solvent to release the additive or the additive composition.

It has been found that the polyvinyl alcohol copolymer P1 of the invention with a degree of hydrolysis in the range from 75 to 95 mol % exhibits a particularly good water solubility, even when the liquid aqueous solvent has a temperature of approximately ≤15° C., in particular about 1 to 10° C., and/or when the liquid aqueous solvent has a pH in the range from 6 to 14. This means that even in the case of mines with water or aqueous solvent having low temperatures (≤15° C., in particular about 1 to 10° C.) and/or a pH in the range from 6 to 14, the material of the receptacle of the invention dissolves at a good rate. Even in liquid aqueous solvents having a comparatively high content of salts and/or minerals (in particular NaCl, $CaCO_3$ and $MgCO_3$), such as for example seawater, a good water solubility is achieved with the receptacle of the invention.

The polyvinyl alcohol P2 of the invention having a degree of hydrolysis in the range from 87 to 95 mol % likewise exhibits a particularly good water solubility, even when the liquid aqueous solvent has a temperature of approximately ≤15° C., in particular about 1 to 10° C., and/or when the liquid aqueous solvent has a pH in the range from 6 to 14.

Likewise, the mixture of polyvinyl alcohol copolymer P1 and polyvinyl alcohol P2, provided that the comonomer content is in a range from in total 10% to 20% by weight, based on the total weight of polyvinyl alcohol copolymer P1 and polyvinyl alcohol P2, exhibits a particularly good water solubility, even when the liquid aqueous solvent has a temperature of approximately ≤15° C., in particular about 1 to 10° C., and/or when the liquid aqueous solvent has a pH in the range from 6 to 14.

In particular, water-soluble receptacles of the invention, which comprise the polyvinyl alcohol copolymer P1, have the feature that ageing processes which negatively affect the solubility and the mechanical properties (such as deformability, flexibility, brittleness) of the receptacle in aqueous solvents are suppressed in these receptacles or proceed only at a slow rate. Without being bound to this theory, it is assumed that the crystallization of the polymer during storage, chemical reactions with surrounding media, in particular cyanide compounds, during storage and the water content of the polymer composition play a role in these ageing processes.

According to the invention, the total content of repeating units of the at least one comonomer, selected from pentaerythritol acrylate and pentaerythritol acrylate derivatives and also optionally acrylic acid, is in a range from in total 10% to 20% by weight, based on the total weight of polyvinyl alcohol copolymer P1 and polyvinyl alcohol P2 (when present). If polyvinyl alcohol P2 is not present, the comonomer content is based on the weight of the polyvinyl alcohol copolymer P1 alone. It has been observed that a comonomer content of at least 10% by weight is required in order to achieve sufficient inhomogeneity in the polymer chains of the polymer composition to suppress crystallization of the polymers and to ensure solubility even after relatively long periods of storage. Even after storage in a chemically aggressive environment (for example in the presence of cyanide compounds), good dissolution characteristics could be observed for polyvinyl alcohol copolymers P1 having a comonomer content of in total 10% to 20% by weight. A comonomer content of more than 20% by weight in turn has a negative influence on the dissolution characteristics of the polymer composition and is therefore disadvantageous.

With a wall thickness of the receptacle in the range from 5 to 50 μm, the walls of the receptacle have a good ratio of surface area to volume. This means that the thickness of the material through which the liquid water or the liquid aqueous solvent must "work its way through" is relatively small. This also contributes to a good dissolution rate of the receptacle. Furthermore, receptacles having a wall thickness in the range from 5 to 50 μm exhibit sufficiently good mechanical stability.

The polyvinyl alcohol copolymer P1, just like the polyvinyl alcohol P2, has thermoplastic properties. In this respect, material produced from the polymer composition can be thermoplastically deformed and joined by fusion welding. Accordingly, walls of the receptacle can be joined to one another by fusion welding.

A "receptacle" in the context of this invention is a spatial structure serving to accommodate substances and enclosing said substances at least partially. It may for example be designed as a dimensionally stable vessel or as a pouch. Film pouches are particularly preferred. Film pouches can for example be obtained by welding two film plies, by folding one film and welding the open sides, or preferably from film tubes by welding both ends.

"Water-soluble" or "soluble" in the context of this invention and with respect to the receptacle means that the receptacle dissolves in a sufficient amount of an aqueous solvent to an extent of at least 50% by weight, preferably at least 75% by weight, especially at least 95% by weight, based on the total weight of the water-soluble receptacle. Any non-water-soluble components of the polymer composition are accordingly "released" by the dissolution of the water-soluble components.

The rate of dissolution of the water-soluble receptacle can be determined here for example by dissolving the water-soluble receptacle, containing a predetermined amount of at least one water-soluble dye or at least one water-soluble dye composition, in an aqueous solvent with stirring and at a predetermined temperature, in particular at a temperature predefined by the planned application (for example a temperature ≤15° C.), and ascertaining the time until the maximum dye concentration in the solution is achieved. To ascertain the achievement of the maximum dye concentration, the extinction of the solution may for example be determined at regular intervals, for example using UV/Vis spectroscopy or photometry. A method for determining the rate of dissolution of the water-soluble receptacle is described in the examples. Those skilled in the art can adapt the method described there to the respective requirements.

The completeness of the dissolution of the water-soluble receptacle can for example be determined optically. Large polymer residues are visually identifiable in the event of incomplete dissolution (possibly after filtration). Smaller polymer residues can be detected using suitable optical methods, for example by means of nephelometry, due to the Tyndall effect. Those skilled in the art are familiar with suitable methods.

Particular preference is given to using a polymer composition which dissolves without residues, that is to say the water-soluble receptacle dissolves in the aqueous solvent to an extent of 100% by weight. This avoids residues of the polymer composition which when used in a mine may lead to clogging of filter systems and/or pumps.

An "aqueous solvent" in the context of this invention is a solvent which consists of water to an extent of at least 50% by weight, in particular at least 60% by weight, based on the total weight of the solvent. In addition to this, the aqueous solvent can comprise dissolved additive substances, especially basic additive substances (for example hydroxide salts such as NaOH and KOH), salts (such as NaCl, $CaCO_3$, $Ca(OH)_2$, $MgCO_3$) and also at least one cyanide compound. Suitable cyanide compounds are in particular alkali metal cyanide compounds, for example sodium cyanide (NaCN) and potassium cyanide (KCN).

The water used can in principle be from any source. It may be drinking water, demineralized water, ground water, river water, seawater, reprocessed water, for example process water, especially from the mining industry (for example a reprocessed leaching agent solution). The composition of the solvent relates here to the solvents and the substances dissolved therein. Solids, such as for example sediments from river water, are not taken into account.

Polyvinyl alcohols are generally produced industrially by first producing a polyvinyl ester by means of suitable polymerization processes. The polyvinyl ester obtained is then converted to polyvinyl alcohol in a polymer-analogous hydrolysis reaction, the proportion of vinyl ester repeating units remaining in the polymer possibly varying depending on the reaction conditions. The proportion of vinyl alcohol repeating units in the polymer is typically given in mol % and is referred to as the degree of hydrolysis of the polyvinyl alcohol.

The polyvinyl alcohol copolymers P1 of the invention and the polyvinyl alcohols P2 of the invention can therefore not be obtained by the direct copolymerization of the monomers constituting them but instead are obtained by a polymerization followed by hydrolysis of the polymer obtained.

The composition of the polyvinyl alcohol copolymer P1 and of the polyvinyl alcohol P2 can be determined by means of known analysis methods. IR and NMR spectroscopy are particularly suitable.

NMR analysis of the polyvinyl alcohol copolymer P1 and of the polyvinyl alcohol P2 is conducted for example using $^{1}H$ NMR and $^{13}C$ NMR in solution (with a suitable solvent such as deuterated dimethyl sulfoxide, DMSO-D6) or in the solid state.

IR analysis of the polyvinyl alcohol copolymer P1 and of the polyvinyl alcohol P2 is conducted for example using ATR infrared spectroscopy (ATR=attenuated total reflection) on polymer films.

The degree of hydrolysis of the polyvinyl alcohol copolymer P1 and of the polyvinyl alcohol P2 can be determined by means of quantitative $^{1}H$ NMR spectroscopy. In order to avoid proton exchange in the polyvinyl alcohol, a solid-state $^{1}H$ NMR spectrum is recorded using a suitable internal standard. Quantitative evaluation of the areas of the individual signals in the $^{1}H$ NMR spectrum, which can be assigned to the protons in the polymer, makes it possible to quantitatively determine the degree of hydrolysis.

The polymer composition contains at least one polyvinyl alcohol copolymer P1 having a degree of hydrolysis in the range from 75 to 95 mol % and/or at least one polyvinyl alcohol P2 having a degree of hydrolysis in the range from 87 to 95 mol %.

The polyvinyl alcohol copolymers P1 of the invention can be obtained by hydrolysis from poly(vinyl ester-co-pentaerythritol acrylate) and derivatives thereof, especially by hydrolysis of poly(vinyl acetate-co-pentaerythritol acrylate) and derivatives thereof. If the hydrolysis of a poly(vinyl ester-co-pentaerythritol acrylate) is ended before the conversion of all vinyl acetate repeating units, poly(vinyl alcohol-co-vinyl ester-co-pentaerythritol acrylate) is obtainable. Complete hydrolysis of the vinyl ester repeating units of poly(vinyl ester-co-pentaerythritol acrylate) enables production of poly(vinyl alcohol-co-pentaerythritol acrylate). Suitable reaction conditions make it possible to selectively obtain poly(vinyl alcohol-co-vinyl ester-co-pentaerythritol acrylate) and poly(vinyl alcohol-co-vinyl ester-co-pentaerythritol acrylate-co-acrylic acid) and derivatives of the aforementioned.

Preferred polyvinyl alcohol copolymers P1 in the context of this invention are polymer compounds comprising or consisting of repeating units in particular of the following structures (I), (II) and (III):

(I)

(II)

(III)

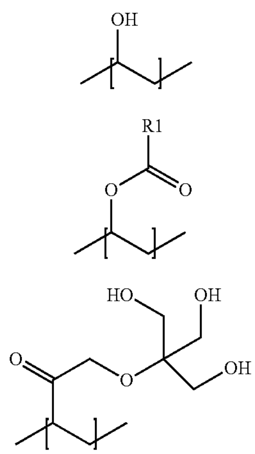

where R1 is a linear or branched alkyl radical having 1 to 8 carbon atoms, preferably a linear alkyl radical having 1 to 5 carbon atoms, and particularly preferably a methyl radical or an ethyl radical.

Polyvinyl alcohol copolymers P1 of the invention can furthermore optionally comprise repeating units of the following structure (IV):

(IV)

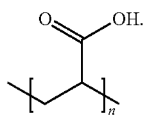

Vinyl alcohol repeating units of the structure (I) are typically obtained by hydrolysis of vinyl ester repeating units of the structure (II). Acrylic acid repeating units of the structure (IV) are typically obtained by hydrolysis of pentaerythritol acrylate repeating units of the structure (III).

Repeating units of the structure (I) are also referred to herein as vinyl alcohol repeating units. Repeating units of the structure (II) are also referred to herein as vinyl ester repeating units. Repeating units of the structure (III) are also referred to herein as pentaerythritol acrylate repeating units. Repeating units of the structure (IV) are also referred to herein as acrylic acid repeating units.

In a further preferred embodiment, the polyvinyl alcohol copolymer P1 of the invention comprises or consists of repeating units of the following structures (I), (II.1), (III) and optionally (IV):

(I)

(II.1)

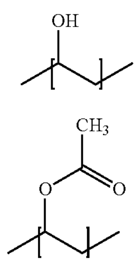

-continued (III)

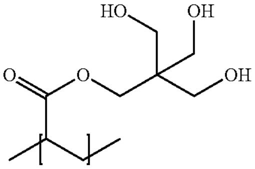

(IV)

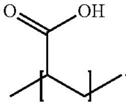

Repeating units of the structure (II.1) are also referred to herein as vinyl acetate repeating units.

The polyvinyl alcohol copolymers P1 of the invention are produced by the copolymerization of monomers having hydrolysable functional groups (in particular vinyl esters) and pentaerythritol acrylate (derivatives), followed by a polymer-analogous hydrolysis of at least some of the hydrolysable functional groups in the polymer obtained. The degree of hydrolysis of a polyvinyl alcohol copolymer P1 reported herein indicates the molar proportion of vinyl alcohol repeating units of the structure (I), based on the sum total of the vinyl alcohol repeating units of the structure (I) and the repeating units obtained from the polymerization of monomers having hydrolysable functional groups (in particular repeating units of the structure (II) or (II.1)). Further comonomers, in particular repeating units of the structures (III) and (IV), are not taken into account when determining the degree of hydrolysis of the polyvinyl alcohol copolymer P1 for the purposes of the invention. However, the further comonomers, especially repeating units of the structure (III), can also enter into hydrolysis reactions. Hydrolysis of the repeating units of the structure (III) results in the obtaining in particular of repeating units of the structure (IV) in a polymer-analogous hydrolysis reaction.

Polyvinyl alcohol copolymers P1 of the invention have a degree of hydrolysis in the range from 75 to 95 mol %, preferably 80 to 90 mol %, more preferably 85 to 90 mol %. This means that the polyvinyl alcohol proportions of these polyvinyl alcohol copolymers P1 are formed to an extent of 75 to 95 mol % from repeating units of the structure (I) and to an extent of 5 to 25 mol % from repeating units of the structure (II), the percentages being based on the sum total of the repeating units of the structure (I) and the repeating units of the structure (II). The polyvinyl alcohol copolymers P1 additionally comprise repeating units of the structure (III) and optionally repeating units of the structure (IV), which do not contribute to the degree of hydrolysis or are not taken into account in the calculation of the degree of hydrolysis.

In a preferred embodiment of the invention, the polymer composition comprises at least one polyvinyl alcohol copolymer P1 having at least one vinyl alcohol repeating unit, at least one vinyl acetate repeating unit and at least one pentaerythritol acrylate repeating unit. In one embodiment, the polyvinyl alcohol copolymer P1 additionally comprises acrylic acid repeating units. The polyvinyl alcohol copolymer P1 can therefore preferably be selected from a poly(vinyl alcohol-co-vinyl acetate-co-pentaerythritol acrylate) or a derivative thereof, a poly(vinyl alcohol-co-vinyl acetate-co-pentaerythritol acrylate-co-acrylic acid) or a derivative thereof, or a mixture of the aforementioned. The polyvinyl alcohol copolymer P1 is preferably a poly(vinyl alcohol-co-vinyl acetate-co-pentaerythritol acrylate), a poly (vinyl alcohol-co-vinyl acetate-co-pentaerythritol acrylate-co-acrylic acid) or a mixture of the aforementioned.

In one embodiment, the polyvinyl alcohol copolymer P1 is a polyvinyl alcohol copolymer P1.1 which comprises 10% to 20% by weight of repeating units which are derived from pentaerythritol acrylate (repeating units of the formula (III)), are derived from pentaerythritol acrylate derivatives and are derived from optionally acrylic acid (repeating units of the formula (IV)), based on the total weight of polyvinyl alcohol copolymer P1. More preferably, the polyvinyl alcohol copolymer P1.1 comprises repeating units which are derived from pentaerythritol acrylate (repeating units of the formula (III)), are derived from pentaerythritol acrylate derivatives and optionally are derived from acrylic acid (repeating units of the formula (IV)), in a range from 10.5% to 17.5% by weight, especially 11% to 15% by weight, based on the total weight of polyvinyl alcohol copolymer P1.1. The proportion of repeating units which are derived from vinyl alcohol (repeating units of the formula (I)) and are derived from vinyl ester (repeating units of the formula (II)) in the polyvinyl alcohol P1.1 is accordingly 80% to 90% by weight, based on the total weight of the polyvinyl alcohol copolymer P1.1, preferably 82.5% to 89.5% by weight, more preferably 85% to 89% by weight.

The ratio of pentaerythritol acrylate repeating units (repeating units of the formula (III)) and/or repeating units of pentaerythritol acrylate derivatives to acrylic acid repeating units (repeating units of the formula (IV)) in the polyvinyl alcohol copolymer P1 is preferably in a range from 1:1 to 1:0.

The polyvinyl alcohol proportion in the polyvinyl alcohol copolymer P1 consists, as has already been described, of vinyl alcohol repeating units and vinyl ester repeating units (preferably vinyl acetate repeating units). The proportion of vinyl ester repeating units here is in a range from 5 to 25 mol %, based on the total amount of polyvinyl alcohol repeating units and vinyl ester repeating units in the polyvinyl alcohol copolymer P1, preferably in a range from 10 to 20 mol %, and particularly preferably in a range from 10 to 15 mol %. In this case, the polyvinyl alcohol proportion present in the polyvinyl alcohol copolymer P1 thus comprises vinyl alcohol repeating units in the range from 75 to 95 mol %, preferably in the range from 80 to 90 mol %, particularly preferably in the range from 85 to 90 mol %, based on the total amount of polyvinyl alcohol repeating units and vinyl ester repeating units in the polyvinyl alcohol copolymer P1. This corresponds to a degree of hydrolysis of the polyvinyl alcohol proportion of 75 to 95 mol %, preferably 80 to 90 mol %, particularly preferably 85 to 90 mol %.

In other words, in a preferred embodiment the polyvinyl alcohol copolymer P1 comprises:

a) 80% to 90% by weight, preferably 82.5% to 89.5% by weight, particularly preferably 85% to 89% by weight, based on the total weight of polyvinyl alcohol copolymer P1, of repeating units of the formulae (I) and (II.1), and
b) 10% to 20% by weight, preferably 10.5% to 17.5% by weight, especially 11% to 15% by weight, based on the total weight of polyvinyl alcohol copolymer P1, of repeating units of the formulae (III) and (IV), wherein the repeating units of the formula (I) make up 75 to 95 mol %, preferably 80 to 90 mol %, especially 85 to 90 mol % of the repeating units of the formulae (I) and (II.1), based on the sum total of repeating units of the formulae (I) and (II.1), and wherein repeating units of the formula (III) make up 50 to 100 mol %, preferably 60 to 100 mol %, of the repeating units of the formulae (III) and (IV), based on the sum total of repeating units of the formulae (III) and (IV).

The polyvinyl alcohol copolymers P1 of the invention exhibit good solubility in aqueous solvents, in particular even at low temperatures above 0° C. or at 0° C., and also over a wide pH range. The solubility is also good in aqueous solvents having a comparatively high content of salts and/or minerals. Without being bound to the theory, it is assumed that the sterically demanding pentaerythritol acrylate repeating units have an influence on the degree of crystallization of the polyvinyl alcohol and polyvinyl ester repeating units and thereby positively influence the solubility of the polymer in aqueous solvents. The influence of the degree of crystallization and the solubility of polyvinyl alcohols is described for example by M. L. Hallensleben in the chapter "Polyvinyl Compounds, others" in Ullmann's Encyclopedia of Industrial Chemistry, 2012, Vol. 29, Wiley-VCH Verlag Gmbh & Co. KGaA, Weinheim, Germany, page 606, left-hand column, third paragraph.

Preferred polyvinyl alcohols P2 in the context of this invention are polymer compounds comprising repeating units of the following structures (I) and (II):

(I)

(II)

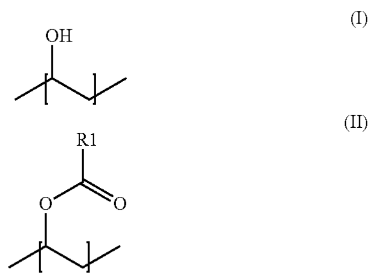

where R1 is a linear or branched alkyl radical having 1 to 8 carbon atoms, preferably a linear alkyl radical having 1 to 5 carbon atoms, and particularly preferably a methyl radical or an ethyl radical.

In a preferred embodiment, the polyvinyl alcohol P2 of the invention comprises or consists of repeating units of the following structures (I) and (II.1):

(I)

(II. 1)

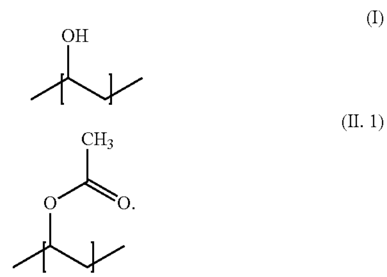

The polyvinyl alcohols P2 of the invention can be produced by the polymerization of monomers having hydrolysable functional groups (in particular vinyl esters), followed by a polymer-analogous hydrolysis of at least some of the hydrolysable functional groups in the polymer obtained. The degree of hydrolysis of a polyvinyl alcohol P2 therefore indicates the molar proportion of vinyl alcohol repeating units of the structure (I), based on the sum total of vinyl alcohol repeating units of the structure (I) and of repeating units which are obtained from the polymerization of the monomers having hydrolysable functional groups and remain as such after the hydrolysis reaction in the polyvinyl alcohol P2 (repeating units of structure (II)).

Polyvinyl alcohols P2 of the invention have a degree of hydrolysis in the range from 87 to 95 mol %. This means that these polyvinyl alcohols P2 are formed to an extent of 87 to 95 mol % from repeating units of the structure (I) and to an extent of 5 to 13 mol % from repeating units of the structure (II), the percentages being based on the sum total of the repeating units of the structure (I) and the repeating units of the structure (II).

In one embodiment of the invention, the water-soluble polymer composition of the invention comprises at least one polyvinyl alcohol P2, wherein the polyvinyl alcohol P2 comprises at least one vinyl alcohol repeating unit and at least one vinyl ester repeating unit. The at least one vinyl ester repeating unit is preferably a vinyl acetate repeating unit (i.e. ethenyl acetate repeating unit, repeating unit of the structure (II.1)). The proportion of vinyl ester repeating units in the polyvinyl alcohol P2 of the invention is in a range from 5 to 13 mol %, based on the composition of the polyvinyl alcohol P2. The proportion of vinyl alcohol repeating units in the polyvinyl alcohol P2 of the invention is correspondingly in a range from 87 to 95 mol %, based on the composition of the polyvinyl alcohol P2. The proportion of vinyl alcohol repeating units is preferably in a range from 91 to 94 mol %, particularly preferably in a range from 92 to 93 mol %. Accordingly, the degree of hydrolysis of the polyvinyl alcohol P2 is in a range from 87 to 95 mol %, based on the composition of the polyvinyl alcohol P2, preferably in a range from 91 to 94 mol %, particularly preferably in a range from 92 to 93 mol %. In this case, the polyvinyl alcohol P2 present in the water-soluble polymer composition therefore has vinyl alcohol repeating units in the range from 87 to 95 mol %, preferably in the range from 91 to 94 mol %, particularly preferably in the range from 92 to 93 mol %, and has vinyl acetate repeating units in the respectively corresponding range, that is to say in the range from 5 to 13 mol %, preferably in the range from 4 to 9 mol %, particularly preferably in the range from 7 to 8 mol %. Such a poly(vinyl alcohol-co-vinyl ester), preferably a poly (vinyl alcohol-co-vinyl acetate), exhibits good solubility in aqueous solvents in particular at a temperature of ≤15° C. and over a wide pH range.

The water-soluble polymer composition can comprise at least one of the polyvinyl alcohol copolymers P1 described herein, at least one of the polyvinyl alcohols P2 described herein, or a mixture of at least two of the aforementioned polyvinyl alcohol copolymers P1 and/or polyvinyl alcohols P2. In one embodiment of the invention, the water-soluble polymer composition comprises at least one polyvinyl alcohol copolymer P1 and at least one polyvinyl alcohol P2, that is to say a mixture of at least one polyvinyl alcohol copolymer P1 and at least one polyvinyl alcohol P2.

In such an embodiment of the invention, the water-soluble polymer composition comprises at least one polyvinyl alcohol copolymer P1.2 and at least one of the aforementioned polyvinyl alcohols P2, wherein the total content of repeating units of the at least one comonomer, selected from pentaerythritol acrylate and pentaerythritol acrylate derivatives and also optionally acrylic acid, that is to say in particular the total content of repeating units of the formulae (III) and (IV), is in a range from in total 10% to 20% by weight, based on the total weight of polyvinyl alcohol copolymer P1 and polyvinyl alcohol P2. In this case, the polyvinyl alcohol copolymer P1 as embodiment P1.2 should thus be selected so that the predefined comonomer content, based on the total weight of polyvinyl alcohol copolymer P1 and polyvinyl alcohol P2, is complied with. In order to keep the total content of repeating units of the formulae (III) and (IV) in a range from in total 10% to 20% by weight based on the total weight of polyvinyl alcohol copolymer P1 and polyvinyl alcohol P2, in a polymer composition which comprises both polyvinyl alcohol copolymer P1 and polyvinyl alcohol P2, due to the relationship of the content of repeating units of formulae (III) and (IV) with the total weight of polyvinyl alcohol copolymer P1 and polyvinyl alcohol P2, the comonomer content in the polyvinyl alcohol copolymer P1.2 should be selected to be higher than in the case where only polyvinyl alcohol copolymer P1 or polyvinyl alcohol copolymer P1.1 (i.e. without polyvinyl alcohol P2) was present in the polymer composition. Polyvinyl alcohol copolymer P1.2 thus differs from the embodiment described herein of the polyvinyl alcohol copolymer P1.1 in particular in terms of the comonomer content.

In a further preferred embodiment of the invention, the water-soluble polymer composition consists of at least one polyvinyl alcohol copolymer P1 and/or at least one polyvinyl alcohol P2 to an extent of at least 75% by weight, based on the total weight of the polymer composition, preferably to an extent of at least 85% by weight, particularly preferably to an extent of at least 90% by weight.

In a preferred embodiment of the invention, the water-soluble polymer composition consists of at least one polyvinyl alcohol copolymer P1 to an extent of at least 75% by weight, based on the total weight of the polymer composition, preferably to an extent of at least 85% by weight, particularly preferably to an extent of at least 90% by weight, wherein the content of repeating units of the at least one comonomer is in a range from in total 10% to 20% by weight, based on the total weight of polyvinyl alcohol copolymer P1. This polyvinyl alcohol copolymer P1 corresponds to the polyvinyl alcohol copolymer P1.1.

In an alternative embodiment of the invention, the water-soluble polymer composition consists of at least one polyvinyl alcohol P2 to an extent of at least 75% by weight, based on the total weight of the polymer composition, preferably to an extent of at least 85% by weight, particularly preferably to an extent of at least 90% by weight.

In a further alternative embodiment of the invention, the water-soluble polymer composition consists of a mixture of at least one polyvinyl alcohol copolymer P1 and at least one polyvinyl alcohol P2 to an extent of at least 75% by weight, based on the total weight of the polymer composition, preferably to an extent of at least 85% by weight, particularly preferably to an extent of at least 90% by weight, wherein the polymer composition has a content of repeating units of the at least one comonomer in a range from in total 10% to 20% by weight, based on the total weight of polyvinyl alcohol copolymer P1 and polyvinyl alcohol P2. The polyvinyl alcohol copolymer P1 to be used herein corresponds to the polyvinyl alcohol copolymer P1.2.

Besides the polyvinyl alcohol copolymer P1 and/or the polyvinyl alcohol P2, the polymer composition preferably comprises water. In one embodiment of the invention, the water content in the polymer composition is preferably in a range from 1% to 7% by weight, preferably 3% to 6% by weight, based on the total weight of the polymer composition. In a further embodiment of the invention, the water content in the polymer composition is preferably in a range from 1% to 7% by weight, preferably 3% to 6% by weight, based on the total weight of polyvinyl alcohol copolymer P1 in the polymer composition. In a further embodiment of the invention, the water content in the polymer composition is preferably in a range from 1% to 7% by weight, preferably 3% to 6% by weight, based on the total weight of polyvinyl alcohol P2 in the polymer composition. In a further embodiment of the invention, the water content in the polymer composition is preferably in a range from 1% to 7% by weight, preferably 3% to 6% by weight, based on the total weight of polyvinyl alcohol copolymer P1 and polyvinyl alcohol P2 in the polymer composition. It has been observed that the proportion of water in the polymer composition has a positive influence both on the mechanical properties and on the solubility of the polymer composition. It is assumed that the water molecules in the polymer composition influence the degree of crystallization of the polyvinyl alcohol copolymer P1 and/or of the polyvinyl alcohol P2. The water may be present for example in the form of residual moisture from the production process of the polyvinyl alcohol copolymer P1 and/or of the polyvinyl alcohol P2. It may also be absorbed from the ambient air. In order to be able to comply with the preferred water contents mentioned herein, it may thus be necessary to shield the polymer composition or the water-soluble receptacles of the invention from environments having a high relative humidity.

In addition to the polyvinyl alcohol copolymer P1 and/or the polyvinyl alcohol P2, the water-soluble polymer composition may optionally additionally comprise up to 18% by weight, based on the total weight of the polymer composition, preferably up to 15% by weight, especially up to 5% by weight, of additive substances. These serve in particular to further improve the properties of the polymer composition.

Suitable optional additive substances are known to those skilled in the art and can be selected with respect to the requirements in terms of mechanical and chemical stability and processibility. Suitable additive substances in the context of the present invention are for example stabilizers and antioxidants, agents inhibiting thermal decomposition and decomposition by ultraviolet light, lubricants and demoulding agents, dyes and pigments and also plasticizers. The optional additive substances may also optionally comprise further polymers, in particular water-soluble polymers which differ from the polyvinyl alcohol copolymers P1 and polyvinyl alcohols P2 disclosed herein.

Antioxidants and thermal stabilizers that may be added to the polymer composition are for example halides of group I metals of the periodic table, for example sodium, potassium and/or lithium halides. Zinc fluoride and zinc chloride may also be used. Also usable are sterically hindered phenols, hydroquinones, substituted representatives of this group, secondary aromatic amines, optionally in conjunction with phosphorus-containing acids or salts thereof, and mixtures of these compounds, preferably in concentrations of up to 1% by weight based on the weight of the polymer composition.

Examples of UV stabilizers are various substituted resorcinols, salicylates, benzotriazoles and benzophenones, which are generally used in amounts of up to 2% by weight based on the weight of the polymer composition.

Lubricants and demoulding agents, which may be added in general in amounts of up to 1% by weight based on the weight of the polymer composition, are stearic acid, stearyl alcohol, alkyl stearates and alkyl stearamides and also esters of pentaerythritol with long-chain fatty acids. Calcium, zinc or aluminium salts of stearic acid and also dialkyl ketones, for example distearyl ketone, can also be used. Zinc, magnesium and calcium stearate and also N,N'-ethylenebisstearamide are suitable in particular according to the invention.

Particular preference is given to adding calcium stearate as additive substance to the polymer composition.

The water-soluble receptacle can preferably have an average wall thickness in the range from 10 to 45 μm, particularly preferably in the range from ≥20 to ≤35 μm. This makes it possible to achieve an optimum ratio between good solubility and good mechanical stability of the water-soluble receptacle.

The dimensioning of the size of the water-soluble receptacle can be chosen by those skilled in the art with respect to the amount of dye or dye composition to be accommodated. If the receptacle is designed as a film pouch, it could for example have dimensions in length and/or in width in the range from in each case 10 to 200 mm.

The water-soluble receptacle of the invention is filled with an additive or an additive composition. Said additive/additive composition comprises at least one dye or at least one dye composition. The additive or the additive composition can optionally comprise further substances which are intended to be added to an aqueous solvent. The receptacle of the invention thus also simplifies the addition of the further substances. Examples of suitable additives or additive compositions frequently used in aqueous alkali metal cyanide solutions in mines which may be mentioned include pH buffer salts, pH-correcting agents, bases (e.g. NaOH), water-softening salts, and mixtures thereof.

The dye/dye composition is preferably water-soluble. "Water-soluble" in the context of this invention with respect to the dye or the dye composition means that said dye or dye composition dissolves to an extent of at least 50% by weight based on the total weight of the dye or the dye composition, preferably to an extent of at least 75% by weight, especially to an extent of at least 95% by weight. Particularly preferably, the water-soluble dye or the water-soluble dye composition dissolves without residue, that is to say the dye or the dye composition dissolves to an extent of 100% by weight in the aqueous solvent.

The at least one water-soluble dye or the at least one water-soluble dye composition preferably exhibits a solubility in water (demin.) of 100 g/L.

Preference is given to using a dye or a dye composition which is chemically stable with respect to aqueous solutions of alkali metal cyanide compounds in a temperature range from 0 to 50° C. and/or with a pH in the range from 6 to 14. This means in particular that the dye or the dye composition, after dissolution in an aqueous solvent which contains at least one alkali metal cyanide compound and which additionally has a temperature in the range from 0 to 50° C. and/or a pH in the range from 6 to 14, does not exhibit any chemical reactions with the components present, in particular the alkali metal cyanide ions and the hydroxide ions, which results in a change to the colouration of the dye or of the dye or dyes present in the dye composition in the aqueous solution in terms of colour intensity and/or hue. This contributes to being able to obtain consistent and reproducible dyeing of the alkali metal cyanide-containing aqueous solution.

In a preferred embodiment of the invention, the at least one dye or the at least one dye composition comprises at least one water-soluble azo dye. Suitable azo dyes are known to those skilled in the art. More preferably, the at least one dye or the at least one dye composition comprises at least one azo dye which in an aqueous solvent containing alkali metal cyanide ions and possibly hydroxide ions has a red or blue hue.

In a particularly preferred embodiment of the invention, the at least one dye or the at least one dye composition comprises at least one water-soluble azo dye selected from disodium 6-hydroxy-5-[(E)-(2-methoxy-5-methyl-4-sulfonatophenyl)diazenyl]-2-naphthalenesulfonate (Allura Red, Red E 40, 129), disodium 4-hydroxy-3-[(E)-(4-sulfonato-1-naphthyl)diazenyl]naphthalene-1-sulfonate (carmoisine, Food Red 3, azorubine, Acid Red 14, E 122) and combinations thereof. The chemical structures of these compounds are presented below.

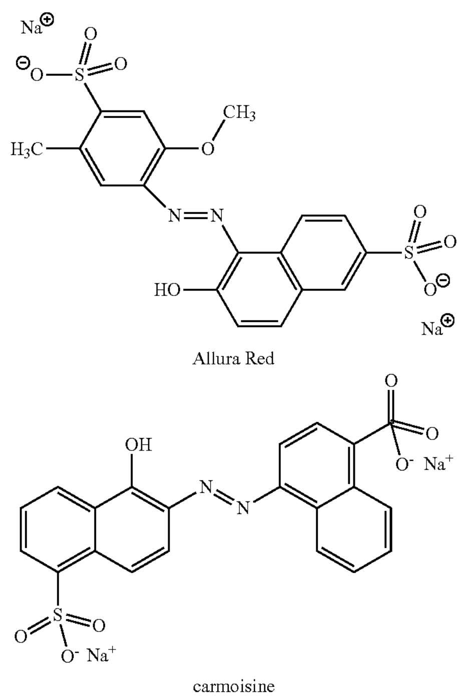

Allura Red carmoisine

The additive or the additive composition can be present in the water-soluble receptacle in the form of a solid, for example as a powder, granules or in pressed form, for example as tablets, in the form of a suspension or in the form of a solution. If the additive or the additive composition is present in the form of a suspension or solution in the water-soluble receptacle, the liquid constituent or constituents of the suspension or solution are not suitable for initiating dissolution or dissolving the polymer composition from which the water-soluble receptacle is formed. Suitable solvents are organic solvents which themselves have good water solubility. Acetone and ethanol should be highlighted in particular. The amounts of organic solvents introduced during application for dyeing aqueous cyanide solutions are negligible and do not interfere with further use.

In the case of additives or additive compositions in the form of powders, the large surface area of the powder contributes to rapid solubility. Powders are often cheaply and readily obtainable.

In contrast to powders, additives or additive compositions in the form of granules (as well as tablets and briquettes) tend to form less dust. This is particularly desirable for compositions with dyes in order to avoid staining of the production plant. The avoidance of dusts is also desirable in the case of potential hazardous materials.

Additives or additive compositions in the form of suspensions reduce the risk of the additive or additive composition extracting some of the water present in the polymer composition of the receptacle of the invention. A reduction in the proportion of water in the polymer composition can impair the solubility thereof.

If additives or additive compositions are used in the form of solutions, the solution form promotes the dissolution process. The actual dissolution of the additives or additive compositions therefore already takes place in an upstream step. The solution then only needs to be mixed with the desired solvent and thus diluted. This is particularly relevant for additives or additive compositions having relatively low water solubility. At the same time, dusts can be avoided.

In the granule form or pressed form, the additive or the additive composition can also contain at least one binder, preferably a water-soluble binder. Advantageously, the binder used can for example be a water-soluble polymer, in particular a water-soluble polyvinyl alcohol copolymer P1 of the invention and/or a water-soluble polyvinyl alcohol P2 of the invention.

The water-soluble receptacle of the invention is advantageously used with at least one solid water-soluble alkali metal cyanide compound. This use enables a simple method for producing a coloured aqueous composition Z2 comprising at least one alkali metal cyanide compound and at least one dye. To this end the at least one alkali metal cyanide compound and the at least one dye can advantageously be provided in the form of a pre-application composition (composition Z1) which provides the application composition (composition Z2) as a result of dissolution in an aqueous solvent.

The invention therefore also provides a composition Z1, comprising at least one solid water-soluble alkali metal cyanide compound and at least one water-soluble receptacle of the invention. The solid water-soluble alkali metal cyanide compound used in this composition Z1 preferably comprises at least one alkali metal cyanide salt. Particularly preferred embodiments of the invention comprise at least sodium cyanide, potassium cyanide, or mixtures of these alkali metal cyanides, particularly preferably sodium cyanide. These are used in particular in the mining industry as leaching agents in the extraction of gold and silver.

The solid water-soluble alkali metal cyanide compound can for example be present in the form of powder, granules, tablets or briquettes.

The water-soluble receptacle used in the composition Z1 corresponds to the water-soluble receptacle of the invention described above. All the definitions given above and above-described embodiments of the water-soluble receptacle of the invention are also applicable and transferable in the context of the composition Z1 of the invention.

It has been observed that the water-soluble receptacles of the invention continue to exhibit good solubility in aqueous solvents even after a relatively long period of storage in contact with the alkali metal cyanide compound mentioned.

The weight ratio ($mass_{dye}/mass_{alkali\ metal\ cyanide}$) of water-soluble dye to water-soluble alkali metal cyanide compound in the composition Z1 of the invention is preferably in a range from 0.00002:5 to 0.0002:5.

The composition Z1 is preferably provided in a package, in particular in a package which is conventionally used for the sale, transport and/or further processing of the alkali metal cyanide compounds used. The package is preferably selected from a container, a big bag, a box, a big bag in a box, a drum, especially a container, a 1000-kg big bag in a box, or a 1000-kg big bag. Here, the package can be designed such that the dissolution process in the dissolution station can be effected directly in the package by addition of the aqueous solvent. The composition Z1 is preferably protected in the package against contact with high relative humidity. This reduces the absorption of water both by the alkali metal cyanide compounds and by the receptacles of the invention, and ensures optimum dissolution properties of the composition Z1 for the user.

The invention further provides a method for producing the above-described composition Z1, comprising at least one solid water-soluble alkali metal cyanide compound and at least one water-soluble receptacle of the invention, wherein the method comprises at least bringing together the at least one water-soluble receptacle with the at least one solid water-soluble alkali metal cyanide compound, and wherein the water-soluble receptacle contains an additive or an additive composition comprising at least one water-soluble dye or at least one water-soluble dye composition. The method for producing the composition Z1 preferably comprises at least the following method steps:

(i) providing a predetermined amount of the at least one solid water-soluble alkali metal cyanide compound in a package;

(ii) adding the at least one water-soluble receptacle to the at least one alkali metal cyanide compound in the package, wherein the water-soluble receptacle contains an additive or an additive composition comprising at least one water-soluble dye or at least one water-soluble dye composition;

wherein the amount of the at least one water-soluble alkali metal cyanide compound in the package and the amount of the at least one dye or of the at least one dye composition in the at least one water-soluble receptacle is dimensioned such that, after the dissolution of the obtained composition Z1 in a predefined amount of an aqueous solvent, a dyed aqueous alkali metal cyanide solution having a predefined concentration and having a predetermined extinction coefficient is obtained. The extinction coefficient can be adapted here to the respective needs so that sufficiently strong dyeing of the dyed aqueous composition Z2 is guaranteed and easy identification of cyanide-containing solutions is ensured. The extinction coefficient can be determined by means of UV/Vis spectroscopy or photometry.

The package used in the method is preferably a package which is used for the sale, transport and/or further processing of the alkali metal cyanide compounds used. The package is preferably selected from a container, a big bag, a box, a big bag in a box, a drum, a container, a 1000-kg big bag in a box, or a 1000-kg big bag. Here, the package can be designed such that the dissolution process in the dissolution station can be effected directly in the package by addition of the aqueous solvent.

Optionally, the at least one solid water-soluble alkali metal cyanide compound and the at least one water-soluble receptacle of the invention can be mixed in order to achieve uniform distribution of the components in the package.

The amount of solid water-soluble alkali metal cyanide compound and of the at least one dye or of the at least one dye composition can be optimally matched to one another and adapted to the requirements of the subsequent use. It is thus possible in a simple manner to provide dyed aqueous alkali metal cyanide solutions which have a predefined alkali metal cyanide concentration and dye concentration. Alkali metal cyanide solutions of identical concentration then have the same colour intensity.

The weight ratio ($mass_{dye}/mass_{alkali\ metal\ cyanide}$) of water-soluble dye to water-soluble alkali metal cyanide compound in the method of the invention for producing the above-described composition Z1, comprising at least one water-soluble alkali metal cyanide compound and at least one water-soluble receptacle of the invention, is preferably in a range from 0.00002:5 to 0.0002:5.

The composition Z1 obtained by the method of the invention can advantageously be used in the method of the invention for producing a dyed aqueous composition Z2 which is described below. The presented method for producing a composition Z1 corresponds here to method steps (i) and (ii) of the method of the invention for producing a dyed aqueous composition Z2 comprising at least one water-soluble alkali metal cyanide compound and at least one water-soluble dye.

The invention further provides a method for producing a dyed aqueous composition Z2 which comprises at least one alkali metal cyanide compound and at least one dye. The method comprises introducing at least one water-soluble receptacle of the invention into an aqueous solvent, wherein the at least one water-soluble receptacle contains at least one water-soluble dye or at least one water-soluble dye composition.

The method of the invention for producing a dyed aqueous composition Z2 which comprises at least one water-soluble alkali metal cyanide compound and at least one water-soluble dye, preferably comprises at least the following method steps:

(i) providing at least one water-soluble receptacle of the invention, wherein the water-soluble receptacle contains an additive or an additive composition comprising at least one water-soluble dye or at least one water-soluble dye composition;

(ii) providing at least one solid water-soluble alkali metal cyanide compound;

(iii) introducing the at least one water-soluble receptacle and the at least one solid water-soluble alkali metal cyanide compound into an aqueous solvent; and (iv) optionally mixing the at least one water-soluble receptacle and the at least one water-soluble alkali metal cyanide compound with the aqueous solvent in order to promote the dissolution of the at least one water-soluble receptacle and the at least one water-soluble alkali metal cyanide compound in the aqueous solvent.

The water-soluble receptacle which is used in the method for producing a coloured aqueous composition Z2 which comprises at least one water-soluble alkali metal cyanide compound and at least one water-soluble dye corresponds to the above-described water-soluble receptacle of the invention. All the definitions given above and above-described embodiments of the water-soluble receptacle of the invention are also applicable and transferable in the context of the method of the invention for producing a dyed aqueous composition Z2.

The alkali metal cyanide compound used in the method comprises at least one water-soluble alkali metal cyanide compound, preferably at least one alkali metal cyanide salt. Particularly preferred embodiments of the invention comprise at least sodium cyanide, potassium cyanide, or mixtures of these alkali metal cyanides. These are used in particular in the mining industry as leaching agents in the extraction of gold and silver. Particular preference is given to sodium cyanide on account of its availability.

The alkali metal cyanide compound is present in the form of a solid, for example as a powder, granules, tablets or briquettes.

To produce a coloured aqueous composition Z2 according to the method of the invention, the at least one water-soluble receptacle and the at least one water-soluble alkali metal cyanide compound are introduced into an aqueous solvent.

In one embodiment of the invention, the at least one water-soluble receptacle, which contains an additive or an additive composition comprising at least one water-soluble dye or at least one water-soluble dye composition, and the at least one water-soluble alkali metal cyanide compound are introduced into the aqueous solvent simultaneously.

In an alternative embodiment of the invention, the at least one water-soluble receptacle is first introduced into the aqueous solvent and subsequently, that is to say offset with respect to time, the at least one water-soluble alkali metal cyanide compound is introduced into the aqueous solvent.

In a further alternative embodiment of the invention, the at least one water-soluble alkali metal cyanide compound is first introduced into the aqueous solvent and subsequently, that is to say offset with respect to time, the at least one water-soluble receptacle is introduced into the aqueous solvent.

The at least one water-soluble receptacle and the at least one water-soluble alkali metal cyanide compound are preferably introduced simultaneously into the aqueous solvent. This makes it possible for the at least one water-soluble receptacle and the at least one water-soluble alkali metal cyanide compound to already be mixed with each other prior to introduction into the aqueous solvent. Via the colouration of the aqueous solution, it is possible to identify with simple optical means that an aqueous alkali metal cyanide solution is present and to estimate the concentration of this solution. The above-described composition Z1, comprising at least one solid water-soluble alkali metal cyanide compound and at least one water-soluble receptacle of the invention, can particularly advantageously be used in the context of this embodiment of the invention.

The at least one water-soluble receptacle and the at least one solid water-soluble alkali metal cyanide compound in the form of the above-described composition Z1, which comprises at least one solid water-soluble alkali metal cyanide compound and at least one water-soluble receptacle of the invention, can advantageously be used in the method for producing a dyed aqueous composition Z2.

In a further embodiment of the invention, the at least one water-soluble receptacle and the at least one solid water-soluble alkali metal cyanide compound are initially introduced only into a portion of the aqueous solvent. After the at least one water-soluble receptacle and/or the at least one water-soluble alkali metal cyanide compound has dissolved in the portion of the aqueous solvent, the remaining aqueous solvent is then added in order to achieve the desired concentration of the dyed aqueous composition Z2.

In an optional method step, the dissolution of the at least one water-soluble receptacle and of the at least one water-soluble alkali metal cyanide compound in the aqueous solvent can be promoted by actively mixing the at least one water-soluble receptacle and the at least one water-soluble alkali metal cyanide compound with the aqueous solvent, for example with the aid of a mechanical mixing method in which a static or dynamic mixer may be used.

According to the invention, the dyed aqueous composition Z2 comprises at least one water-soluble dye, at least one water-soluble alkali metal cyanide compound and at least water as solvent. In addition, the dyed aqueous composition Z2 comprises the constituents of the dissolved polymer composition of the water-soluble receptacle. The concentration of water-soluble dye in the dyed aqueous composition Z2 is preferably in a range from 0.000001 to 0.0006 mol/L, more preferably in a range from 0.000006 to 0.00006 mol/L. The concentration of water-soluble alkali metal cyanide compound in the dyed aqueous composition Z2 is preferably in a range from 1.5 to 10 mol/L. The molar ratio of water-soluble dye to water-soluble alkali metal cyanide compound in the dyed aqueous composition Z2 is preferably in a range from 0.00002:5 to 0.0001:5.

The non-binding recommendation of the International Cyanide Management Institute provides for a concentration of 0.03 g (of dye)/L of aqueous NaCN solution with an NaCN content of 23%.

The pH and the temperature of the aqueous solvent used can vary over a wide range according to the invention. This makes it possible to perform the method under various external conditions, in particular in mines in very varied regions of the world.

The aqueous solvent can have a pH at the start of method step (iii) in a range from pH 6 to pH 14, preferably in a range from pH 6.5 to pH 13, especially in a range from pH 6.5 to pH 12.5. The aqueous solvent can have a temperature at the start of method step (iii) of 0 to 50° C., especially 0 to 25° C. or 0 to 15° C.

The invention is explained in more detail on the basis of the following examples.

EXAMPLES

Comparative tests with polyvinyl alcohol films having a degree of hydrolysis of more than 95 mol % have shown that these do not dissolve at the desired rate. For example, even after dissolution times of around 20 minutes, visible film pieces were still present in the aqueous solvent, in particular at temperatures of ≤15° C.

Polymer pouches according to the invention, filled with a water-soluble dye, were produced. The dissolution characteristics of the filled pouches was then investigated by placing these pouches into an aqueous solution and ascertaining the time t ($Ex._{max}$) until maximum dyeing of the solution (maximum extinction of the dye) by the dye.

A defined amount of the dye carmoisine is calculated so that a final concentration of 0.03 g/L is achieved in the test. This amount of dye is weighed into receptacles produced in the form of pouches with a defined format from commercially available water-soluble polyvinyl alcohol having a degree of hydrolysis of 91-94 mol % (PVOH-1: poly(vinyl alcohol-co-vinyl acetate), manufacturer: GS-go soluble wasserlösliche Verpackungen GmbH, D-65582 Diez), commercially available water-soluble polyvinyl alcohol copolymer having a degree of hydrolysis of 85 mol % (PVOH-2: poly(vinyl alcohol-co-vinyl acetate-co-pentaerythritol acrylate), manufacturer: GS-go soluble wasserlösliche Verpackungen GmbH, D-65582 Diez), and commercially available water-soluble polyvinyl alcohol copolymer having a degree of hydrolysis of 85 mol % and a proportion of repeating units derived from pentaerythritol acrylate of 13 mol % (PVOH-3: poly(vinyl alcohol-co-vinyl acetate-co-pentaerythritol acrylate), manufacturer: GS-go soluble wasserlösliche Verpackungen GmbH, D-65582 Diez) and these are sealed with a film welder so that a dye-filled polymer pouch is obtained. The employed polyvinyl alcohols and polyvinyl alcohol copolymers were analysed by means of IR and/or NMR spectroscopy as described herein. $^{1}H$ and $^{13}C$ NMR spectroscopy was performed in DMSO-D6 as solvent (Bruker Avance III 600; 600 MHz (H1); DMSO-D6; 27° C.; 1H-NMR: 32 scans, 30° pulse, acquisition time 2.7 sec., time domain 65536; $^{13}C$: 400 scans, 30° pulse, acquisition time 1.8 sec., time domain 131072, power gated decoupling). $^{13}C$ NMR spectroscopy was additionally performed in the solid state (Bruker Avance III HD; 400 MHz (H1); ambient temperature (approx. 22° C.); pulse sequence: cross polarization with ramp, rotational frequency 9 kHz, 12735 scans, relaxation delay 5 sec).

This polymer pouch is then placed in a defined glass beaker (600 ml, wide) with a defined liquid (demineralized water, possibly with addition of NaOH) at a defined pH and stirred using a magnetic stirrer at a defined speed (300 rpm) and temperature. Starting from the release of the first colouration, a sample is taken quickly at defined time intervals (1, 2, 4, 5, 7, 10, 15, 20 minutes) and the extinction is ascertained by colorimetry at a wavelength of 516 nm. A commercial spectrometer (LICO 690, spectral colorimeter from Hach/measurement in 10 mm round cuvettes) is used for this purpose. The samples were each rapidly returned to the glass beaker after the measurement. The dye is completely dissolved upon reaching the extinction maximum. The extinction maximum is reached when no further rise in the measured extinction value is observed for two temporally successive measurements.

The test parameters and measurement results are compiled in Table 1.

is still rapid, with an extinction maximum of the solution after a period of time of around 7 minutes (cf. Ex. 6).

In Examples 7 to 10, the influence of the storage of the polymer pouch according to the invention under various conditions is investigated. To this end, the filled polymer pouch is stored prior to the dissolution test at room temperature (cf. Ex. 10), at 40° C. (cf. Ex. 7 and 8), and in a receptacle with sodium cyanide granules at room temperature (cf. Ex. 9). A comparison with Ex. 5 shows that the storage condition leads to the extinction maximum of the solution not being reached until later. The greatest delay is observed in the polymer pouch which had been stored beforehand in a receptacle with sodium cyanide granules at room temperature (cf. Ex. 9). Nevertheless, the extinction maximum is reached in less than 20 minutes. This time period is sufficiently short for application in a mine since this period of time is also required for the dissolution of the alkali metal cyanide compound.

A comparison of Examples 5, 7 and 8 shows that the solubility of the polymer pouch according to the invention deteriorates as a result of storage at elevated temperatures. Without being bound to the theory, it is suspected that this

TABLE 1

| | Water-soluble receptacle | | | | | | | |
|---|---|---|---|---|---|---|---|---|
| Ex. | Material | Dimensions [mm] | Wall thickness [μm] | Pretreatment | Liquid | pH | T [° C.] | t ($Ex._{max}$) [min] |
| 1 | PVOH-1 | 100 × 130 | 30 | — | $H_2O$ | 6.5 | 20 | approx. 2.5 |
| 2 | PVOH-1 | 100 × 130 | 30 | | $H_2O$ + NaOH | 11.0 ± 0.2 | 18 | approx. 4 |
| 3 | PVOH-2 | 100 × 130 | 30 | — | $H_2O$ + NaOH | 11.0 ± 0.2 | 8-9 | approx. 4 |
| 4 | PVOH-3 | 100 × 130 | 30 | | $H_2O$ + NaOH | 11.0 ± 0.2 | 8-9 | approx. 4 |
| 5 | PVOH-2 | 50 × 50 | 30 | — | $H_2O$ + NaOH | 11.0 ± 0.2 | 8-9 | approx. 4.5 |
| 6 | PVOH-2 | 50 × 50 | 30 | | $H_2O$ + NaOH | 11.0 ± 0.2 | 2-4 | approx. 7 |
| 7 | PVOH-2 | 50 × 50 | 30 | after storage for 2 weeks in a drying cabinet at 40° C. | $H_2O$ + NaOH | 11.0 ± 0.2 | 8-10 | approx. 16 |
| 8 | PVOH-2 | 50 × 50 | 30 | after storage for 1 month in a drying cabinet at 40° C. | $H_2O$ + NaOH | 11.0 ± 0.2 | 8-10 | approx. 15 |
| 9 | PVOH-2 | 50 × 50 | 30 | after storage for 1 month at room temperature among NaCN granules | $H_2O$ + NaOH | 11.0 ± 0.2 | 8-10 | approx. 19 |
| 10 | PVOH-2 | 50 × 50 | 30 | after storage for 1 month at room temperature in the laboratory | $H_2O$ + NaOH | 11.0 ± 0.2 | 8-10 | approx. 10 |

Example 1 shows that the dye is rapidly released by the polymer pouch according to the invention at a temperature of 20° C. and a pH of 6.5 in an aqueous solvent. The extinction maximum is already reached after 2.5 minutes.

At a pH of 11, the time to reach the extinction maximum is extended only to a minor extent, to around 4 minutes. This time period is not extended when reducing the temperature of the solvent to 8 to 9° C. either (cf. Ex. 2 to 4). The dimensions of the polymer pouch have only a minor influence on the dissolution properties (cf. Ex. 5). At a temperature in a range from 2 to 4° C., dissolution is achieved which can be attributed to a reduction in the water content in the polymer composition of the polymer pouch during storage in a drying cabinet at 40° C. and possibly to an increase of the degree of crystallization.

It is also apparent from the examples according to the invention that the receptacle of the invention dissolves at a good rate and thus releases the dye at a good rate.

Tests with polyvinyl alcohol copolymer films (PVOH-3) have shown that the good dissolution properties of the water-soluble receptacles of the invention can also be achieved in aqueous solvents having a high content of salts.

The invention makes it possible to add defined amounts of dye in a polymer packaging to an alkali metal cyanide compound in its commercial packaging. For application in the mine, that is to say for producing a coloured alkali metal cyanide solution, the polymer packaging with the dye or with the dye composition can be dissolved in water together with the alkali metal cyanide compound in a conventional dissolution station. This avoids an additional work step in the dissolution process or an adaptation of the dissolution station. The use of the water-soluble receptacle also reduces the risk for example of the production plant for producing the alkali metal cyanide compounds being contaminated with the dye or the dye composition.

The invention claimed is:

1. A water-soluble receptacle which is suitable for accommodating an additive or an additive composition and is filled with an additive or an additive composition comprising at least one dye or at least one dye composition, wherein the water-soluble receptacle has a wall thickness in a range from 5 to 50 μm, and wherein the water-soluble receptacle comprises a water-soluble polymer composition, wherein the water-soluble polymer composition comprises:

a) at least one polyvinyl alcohol copolymer P1 having a degree of hydrolysis in a range from 75 to 95 mol %, wherein the at least one polyvinyl alcohol copolymer P1 is a copolymer which comprises:

vinyl alcohol repeating units, vinyl ester repeating units, and repeating units of at least one comonomer, wherein the at least one comonomer is selected from pentaerythritol acrylate and optionally acrylic acid;

or b) at least one polyvinyl alcohol copolymer P1 having a degree of hydrolysis in a range from 75 to 95 mol %, wherein the at least one polyvinyl alcohol copolymer P1 is a copolymer which comprises:

vinyl alcohol repeating units, vinyl ester repeating units, and repeating units of at least one comonomer, wherein the at least one comonomer is selected from pentaerythritol acrylate and optionally acrylic acid; and wherein b) further comprises at least one polyvinyl alcohol P2 having a degree of hydrolysis in a range from 87 to 95 mol %;

wherein, in addition to the at least one polyvinyl alcohol copolymer P1 and/or the at least one polyvinyl alcohol P2, the water-soluble polymer composition can additionally optionally contain additive substances;

wherein the water-soluble polymer composition, in the case of a) in which the water-soluble polymer composition comprises at least one polyvinyl alcohol copolymer P1 and no polyvinyl alcohol P2, has a content of repeating units of the at least one comonomer in a range from in total 10% to 20% by weight, based on the total weight of the at least one polyvinyl alcohol copolymer P1;

wherein the water-soluble polymer composition, in the case of b) in which the water-soluble polymer composition comprises at least one polyvinyl alcohol copolymer P1 and at least one polyvinyl alcohol P2, has a content of repeating units of the at least one comonomer in a range from in total 10% to 20% by weight, based on the total weight of the at least one polyvinyl alcohol copolymer P1 and the at least one polyvinyl alcohol P2;

wherein the degree of hydrolysis of the at least one polyvinyl alcohol copolymer P1 and of the at least one polyvinyl alcohol P2 is determined by quantitative $^1H$ NMR spectroscopy; and wherein the water-soluble polymer composition of the at least one polyvinyl alcohol copolymer P1 and of the at least one polyvinyl alcohol P2 is determined by IR and NMR spectroscopy.

2. The water-soluble receptacle according to claim 1, wherein the water-soluble polymer composition comprises at least one polyvinyl alcohol copolymer P1 having a degree of hydrolysis in the range from 80 to 90 mol %.

3. The water-soluble receptacle according to claim 1, wherein the water-soluble polymer composition comprises at least one polyvinyl alcohol P2 having a degree of hydrolysis in the range from 91 to 94 mol %.

4. The water-soluble receptacle according to claim 1, wherein the water-soluble polymer composition comprises at least one polyvinyl alcohol copolymer P1 selected from poly(vinyl alcohol-co-vinyl ester-co-pentaerythritol acrylate), poly(vinyl alcohol-co-vinyl ester-co-pentaerythritol acrylate-co-acrylic acid), and derivatives thereof.

5. The water-soluble receptacle according to claim 1, wherein the water-soluble polymer composition comprises at least one polyvinyl alcohol P2 and the at least one polyvinyl alcohol P2 is a poly(vinyl alcohol-co-vinyl ester).

6. The water-soluble receptacle according to claim 1, wherein the water-soluble polymer composition consists of the at least one polyvinyl alcohol copolymer P1 and/or the at least one polyvinyl alcohol P2 to an extent of at least 75% by weight, based on the total weight of the water-soluble polymer composition.

7. The water-soluble receptacle according to claim 1, wherein the water-soluble polymer composition comprises:

at least one polyvinyl alcohol P2; and

1% to 7% by weight of water, based on the total weight of the at least one polyvinyl alcohol P2.

8. The water-soluble receptacle according to claim 1, wherein the water-soluble polymer composition comprises:

at least one polyvinyl alcohol copolymer P1; and

1% to 7% by weight of water, based on the total weight of the at least one polyvinyl alcohol copolymer P1.

9. The water-soluble receptacle according to claim 1, wherein the water-soluble polymer composition comprises 1% to 7% by weight of water, based on the total weight of the water-soluble polymer composition.

10. The water-soluble receptacle according to claim 1, wherein the at least one dye or the at least one dye composition comprises at least one water-soluble azo dye.

11. A composition Z1, comprising at least one solid water-soluble alkali metal cyanide compound and at least one water-soluble receptacle according to claim 1.

12. A method for producing a composition Z1 according to claim 11, wherein the method comprises at least an addition of the at least one water-soluble receptacle to the at least one alkali metal cyanide compound.

13. The method according to claim 12, wherein the method comprises at least the following method steps:

(i) providing a predetermined amount of the at least one solid water-soluble alkali metal cyanide compound in a package; and (ii) adding the at least one water-soluble receptacle to the at least one alkali metal cyanide compound in the package;

wherein the amount of the at least one water-soluble alkali metal cyanide compound in the package and the amount of the at least one dye or of the at least one dye composition in the at least one water-soluble receptacle is dimensioned such that, after the dissolution of the obtained composition Z1 in a predefined amount of an aqueous solvent, a dyed aqueous alkali metal cyanide solution having a predefined concentration and having a predetermined extinction coefficient is obtained.

14. A method for producing a dyed aqueous composition Z2 comprising at least one alkali metal cyanide compound and at least one dye, wherein the method comprises introducing at least one water-soluble receptacle according to claim 1 into an aqueous solvent, and wherein the at least one water-soluble receptacle contains at least one water-soluble dye or at least one water-soluble dye composition.

15. The method according to claim 14, wherein the method comprises at least the following method steps:

(i) providing at least one water-soluble receptacle, wherein the water-soluble receptacle contains an additive or an additive composition comprising at least one water-soluble dye or at least one water-soluble dye composition;

(ii) providing at least one solid water-soluble alkali metal cyanide compound;

(iii) introducing the at least one water-soluble receptacle and the at least one solid water-soluble alkali metal cyanide compound into an aqueous solvent; and (iv) optionally mixing the at least one water-soluble receptacle and the at least one water-soluble alkali metal cyanide compound with the aqueous solvent to promote the dissolution of the at least one water-soluble receptacle and the at least one water-soluble alkali metal cyanide compound in the aqueous solvent.

16. The method according to claim 14, wherein the at least one water-soluble receptacle and the at least one solid water-soluble alkali metal cyanide compound is used in the form of a composition Z1, wherein the composition Z1 comprises the at least one solid water-soluble alkali metal cyanide compound and the at least one water-soluble receptacle.

17. The water-soluble receptacle according to claim 1, wherein the water-soluble polymer composition consists of the at least one polyvinyl alcohol copolymer P1 and/or the at least one polyvinyl alcohol P2 to an extent of at least 85% by weight, based on the total weight of the water-soluble polymer composition.

18. The water-soluble receptacle according to claim 1, wherein the water-soluble polymer composition consists of the at least one polyvinyl alcohol copolymer P1 and/or the at least one polyvinyl alcohol P2 to an extent of at least 90% by weight, based on the total weight of the water-soluble polymer composition.

19. The water-soluble receptacle according to claim 10, wherein the at least one water-soluble azo dye is selected from the group consisting of disodium 6-hydroxy-5-[(E)-(2-methoxy-5-methyl-4-sulfonatophenyl)diazenyl]-2-naphthalenesulfonate, disodium 4-hydroxy-3-[(E)-(4-sulfonato-1-naphthyl)diazenyl]naphthalene-1-sulfonate, and mixtures thereof.

* * * * *